United States Patent [19]

Oberle et al.

[11] Patent Number: 4,496,107
[45] Date of Patent: Jan. 29, 1985

[54] MACHINE FOR REMOVING BLOCKS OF FORAGE FROM A SILO

[75] Inventors: Edmond Oberle, Saverne; Bernard Wattron, Marmoutier; Jeannot Hironimus, Saverne, all of France

[73] Assignee: Kuhn S.A., Saverne, France

[21] Appl. No.: 398,964

[22] Filed: Jul. 16, 1982

[30] Foreign Application Priority Data

Jul. 23, 1981 [FR] France ............... 81 14512

[51] Int. Cl.³ ............................................. A01F 29/00
[52] U.S. Cl. .................. 241/101.7; 30/379.5; 83/768; 83/928
[58] Field of Search ............ 30/379.5; 241/101.7; 83/928, 758, 747, 768, 647, 523, 565; 74/52, 98

[56] References Cited

U.S. PATENT DOCUMENTS

| 2,524,734 | 10/1950 | Pfau | 74/52 |
| 3,121,488 | 2/1964 | Chittock | 241/101.5 |
| 3,221,419 | 12/1965 | Cohen | 74/52 |
| 3,401,568 | 9/1968 | Blatt | 74/52 |
| 4,195,786 | 4/1980 | Walker | 241/101.7 |
| 4,336,732 | 6/1982 | Liet et al. | 241/101.7 |
| 4,341,354 | 7/1982 | Liet et al. | 241/101.7 |

FOREIGN PATENT DOCUMENTS

| 7808048 | 7/1978 | Netherlands | 83/928 |
| 7903223 | 4/1979 | Netherlands | 83/928 |

Primary Examiner—James M. Meister
Assistant Examiner—John L. Knoble
Attorney, Agent, or Firm—Ernest F. Marmorek

[57] ABSTRACT

A machine for removing blocks of forage from inside a horizontal silo has a chassis with prongs fitted on a lower part of the chassis and extending substantially horizontally, an arm located at a certain distance above the prongs and bearing a cutting device, wherein the arm with the cutting device is hingedly mounted on a crank by means of a substantially vertical first axle, and the crank is hingedly connected to the chassis by a second axle which is offset relative to the first axle.

27 Claims, 6 Drawing Figures

Fig: 3

MACHINE FOR REMOVING BLOCKS OF FORAGE FROM A SILO

BACKGROUND OF THE INVENTION

The present invention concerns a machine for removing blocks of forage from inside a horizontal silo. It has a chassis, the lower part of which is provided with prongs which extend almost horizontally and, at a certain distance above these prongs, there is an arm with a cutting device at its outer extremity.

In a machine of this nature, the arm with the cutting device is hinged to a vertical column. During operation, it pivots around this column in such a manner that the cutting tool traces an arc of a circle and cuts a semi-circular block from the forage mass. The cut surface in the silo thus obtained is not straight, but has rounded notches. This prevents full-sized blocks from being removed in subsequent operations. In addition, on account of the shape of the notches, the cut surface in the silo has a larger area exposed to the air and this causes greater fermentation. These blocks of forage are also unstable, on account of their shape. They can easily topple over which causes them to disintegrate and may, in turn, lead to considerable losses. It is also practically impossible to completely extract the forage from the silo since, on account of the semi-circular cut, part of the forage near the walls of the silo is not removed. This remaining forage must then be removed manually.

In a different machine of this nature, the arm with the cutting device is made of two telescopic elements. The mobile element which bears the cutting device is guided in such a manner that the cutting tool is moved in a U-shaped path. This is carried out by means of a horizontal guiding device which controls the extension or retraction of the telescopic arm, following the path of the cutting device. This arrangement requires several adjustments which make the construction of the machine extremely tricky. In this design, the supporting arm is relatively unstable and this may cause deviations in the level of the cutting device.

One must also constantly check the sliding surfaces of the supporting telescopic arm are clean and well greased in order to avoid friction while a block of forage is being removed. Considerable energy is required to move this arm on account of the friction between the two telescopic elements.

SUMMARY OF THE INVENTION

The object of the present invention is to provide a machine for removing blocks of forage from a horizontal silo without the disadvantages of the prior art. More particularly, it is an object of the present invention to provide a machine which enables blocks of a substantially rectangular shape to be handled, whilst retaining the feature of an extremely rigid arm bearing a cutting device.

For these purposes, an important feature of the invention is the fact that the arm bearing the cutting device is hinged to a crank by means of a substantially vertical axle. The crank itself is hinged to the chassis of the machine by means of a second axle, off-centre in relation to the first axle. It also includes means to drive the aforementioned crank around its articulation axle with the chassis and means to make the supporting arm of the cutting device rotate around its articulation axle with the crank.

These two rotary motions take place in opposite directions to each other. They are synchronised so that when the crank makes three complete revolutions around its axle with the chassis, the supporting arm makes four complete revolutions in relation to its articulation axle which forms one piece with the aforementioned crank. This is equivalent to one complete revolution of this arm with the cutting device in relation to the chassis of the machine.

This arrangement enables the cutting device to be moved in a substantially square-shaped path. In practice, this path will only be partially used, as the blocks are cut into a rectangular shape.

The portion used almost corresponds to half of the path. This rectangular shape yields a substantially straight cut surface in the silo and always ensures that full-sized blocks are handled.

The supporting arm of the cutting device may be made in one piece. This is then very stable and eliminates any risk of malfunction. Finally, there is no need to fit a guiding device to vary the length of this supporting arm during operation.

According to another feature of the invention, the cutting device is mounted pivoting in relation to its supporting arm and is guided whilst in motion so that its knife or knives remain constantly at a tangent to its or their own path. This is done by means of a link which both forms one piece with the cutting device and is also guided on a roller almost at the instantaneous center of rotation of the cutting device.

The roller is attached to an arm connected to the crank to which the supporting arm of the cutting device is hinged.

In an alternative embodiment of the invention, the link or triangle is parallel to a straight line normal to the path of the knife or knives and passing through the instantaneous centre of rotation. The triangle is both hinged to the supporting arm and guided on a roller located on a straight line passing through the articulation axles of the crank and the aforementioned instanteneous center of rotation. The roller is also attached to an arm which forms one piece with the crank to which the supporting arm of cutting device is hinged. The triangle and the cutting device are linked up by means of a connecting rod. These arrangements facilitate optimal orientation of the cutting device to yield a good cut, even in the rounded areas of the cutting path.

A further feature of the invention is that the machine has housing for the knife or knives of the cutting device on at least one of the sides of the chassis.

The knife or knives are thus protected and are not deformed by the forage when the machine is pushed into the silo to remove a block. The housing also affords protection to persons in the vicinity.

Other features and advantages of the invention will emerge from the description which follows, with reference to the attached drawings. These show, as non-limiting examples, two forms of embodiment of the invention.

DESCRIPTION OF PREFERRED EMBODIMENTS

Figure 1:
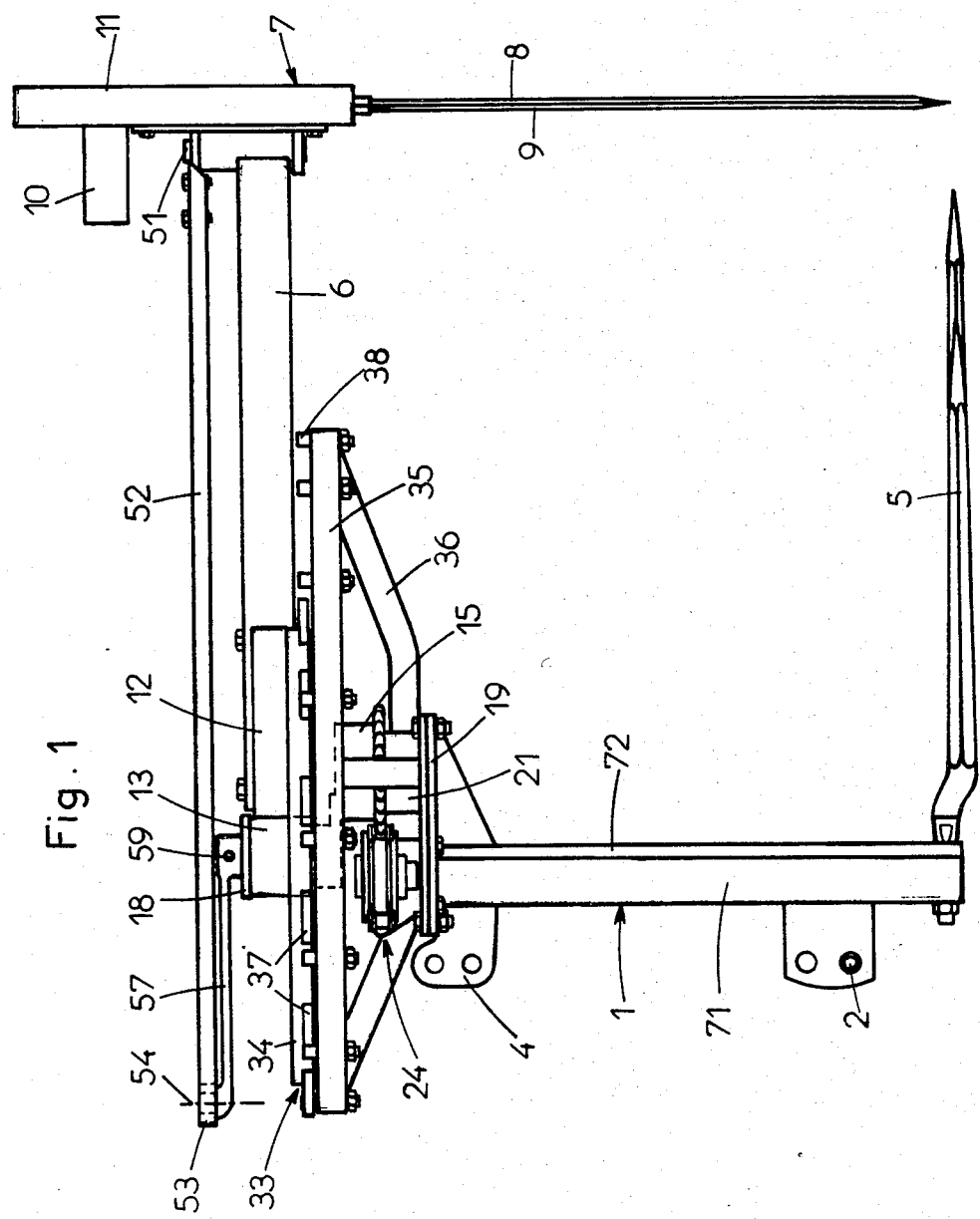
FIG. 1 is a side elevational view of an embodiment of the invention.
Figure 2:
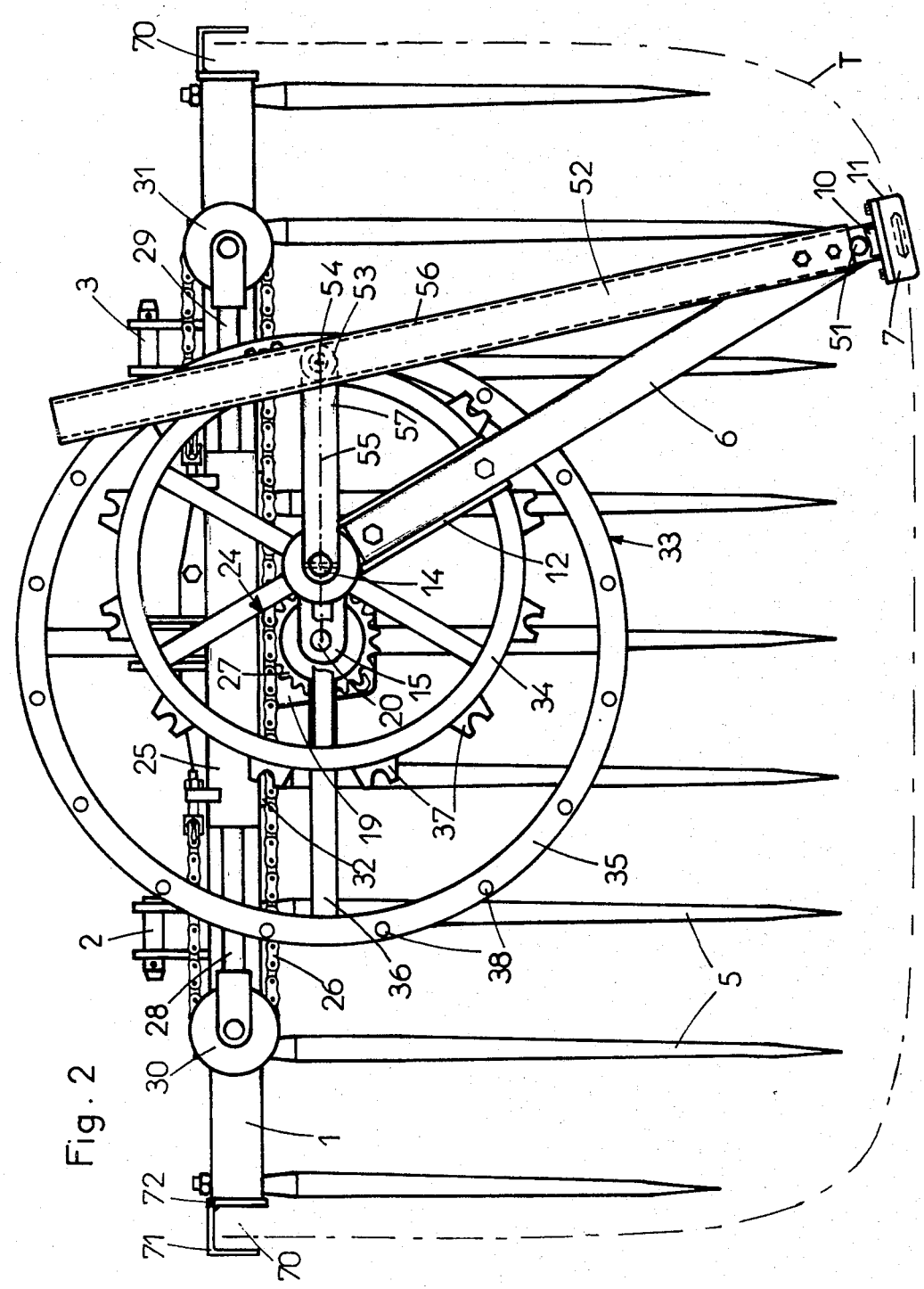
FIG. 2 is a plan view thereof.

As shown in FIGS. 1 and 2, the machine according to the invention comprises a chassis (1) which forms a rigid frame. This chassis (1) has three coupling points to enable it to be hitched to a tractor which is not shown in the drawings. These coupling points include two lower pivots (2 and 3) and an upper flange (4). The chassis is also fitted with prongs (5) in its lower area and the prongs extend almost horizontally. On the upper part of the chassis, there is an arm (6) with a cutting device (7) at its outer extremity. The cutting device has two parallel knives (8 and 9) which are driven in alternation by a hydraulic motor (10) and eccentric gears arranged in a case (11).

The knives (8,9) extend vertically, almost down to the teeth (5) at the lower part of the chassis (1). The two knives (8,9) may also be replaced with a single knife driven in the same manner.

Figure 3:
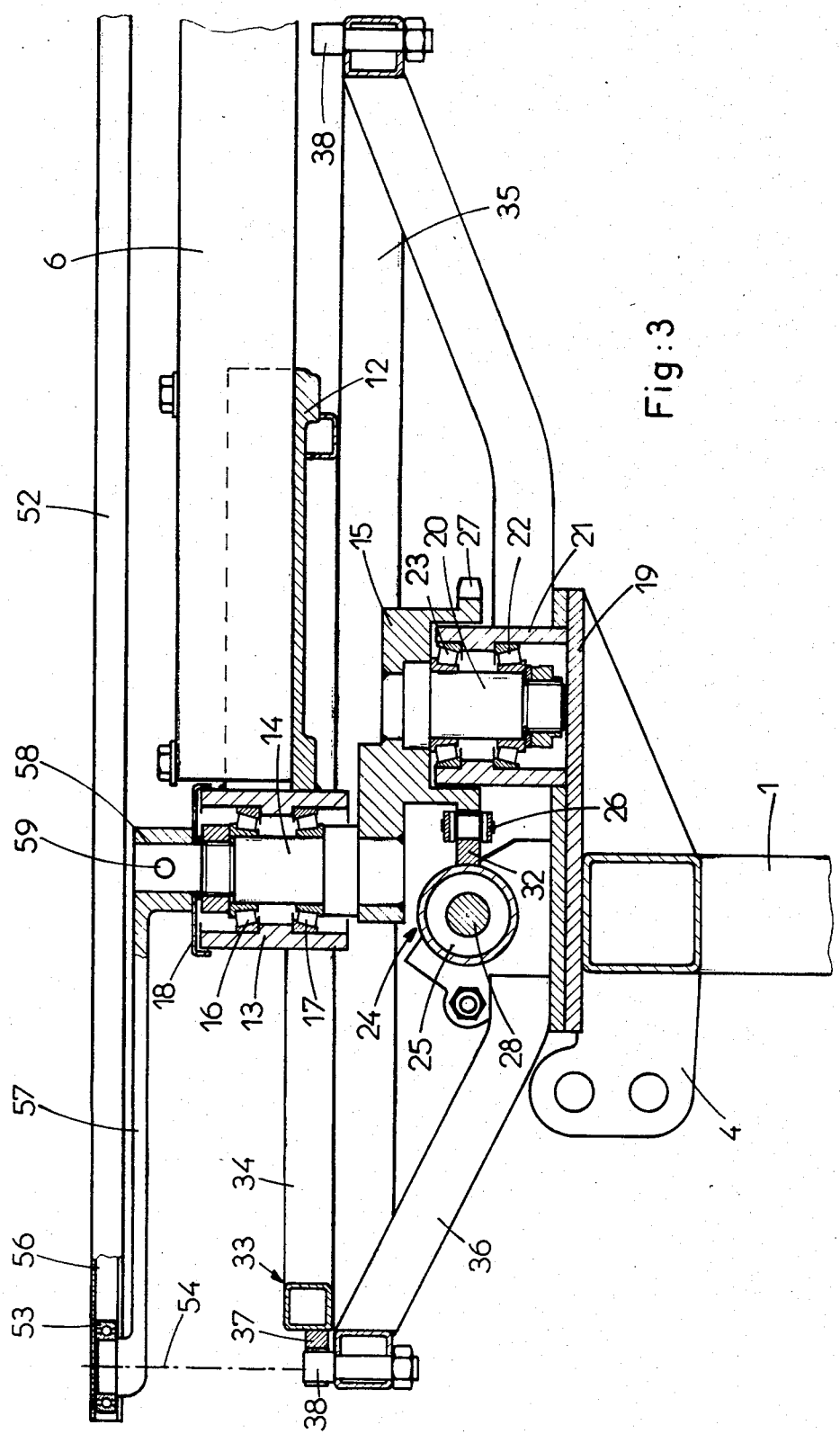
FIG. 3 is a large scale fragmentary view, partly in section, of a driving mechanism thereof.

As emerges from FIG. 3, the supporting arm (6) is screwed to a handle (12) which forms one piece with a sleeve (13). The arm (6) is hinged to a substantially vertical axle (14) of a crank (15) through the sleeve (13). For this purpose, there are two bearings with conical rollers (16,17) inside the sleeve (13). The upper part of the sleeve (13) is closed with a lid (18) which prevents foreign matter from entering the area. The crank itself (15) is hinged to a reinforced plate (19) which forms one piece with the chassis (1), by means of a second articulation axle (20) located off-centre in relation to the first axle (14). To facilitate this, the plate (19) has a sleeve (21) in which the aforementioned articulation axle (20) is guided with the aid of two bearings with conical roller (22,23).

In accordance with an important feature of the invention, means (24) are provided to drive the crank (15) around its articulation axle (20) with the chassis (1), whilst a block of forage is being cut. In the examples shown, these means (24) include a double-action hydraulic jack (25) which operates a chain (26) working in conjunction with a crown gear or toothed wheel (27) which forms one piece with the crank (15). The aforementioned jack has two rods (28,29), each with a pulley (30,31) at their extremities. The chain (26) runs over these pulleys and the two ends of the chain are connected to the body of the jack (25) so that they practically surround this latter (FIG. 2). When the rods (28,29) of the jack (25) are moved to the right or to the left, they drive the chain (26). This causes the crank (15) to rotate around the articulation axle (20) when it engages with its crown gear or toothed wheel (27). This engaging operation takes place with the aid of a longitudinal guide (32) welded on to the body of the jack (25).

Other devices such as a rotary hydraulic motor may be used to set the crank (15) in motion.

Another feature of the invention provides for means (33) to to make the supporting arm (6) of the cutting device (7) rotate around the articulation axle (14) with the crank (15). Rotation of the supporting arm (6) around the articulation axle (14) takes place in the opposite direction to the rotation of the crank (15) around its articulation axle (20) with the chassis (1). The rotation of the crank (15) and the supporting arm (6) are synchronised so that when the crank makes three complete revolutions around its axle (20) with the chassis (1), the supporting arm (6) of the cutting device (7) makes four complete revolutions in relation to its articulation axle (14) with the crank (15). This is equivalent to a complete revolution of the supporting arm (6) and the cutting device (7) in relation to the chassis (1). On account of this synchronisation, the cutting device (7) moves in a square path (T) with slightly rounded corners (angles). In practice, only part of this path (T) will be used to cut rectangular blocks of forage.

As in the first example of execution shown in FIGS. 1 to 3, the second means (33) are composed of a mobile crown gear (34) which forms one piece with the supporting arm (6) of the cutting device (7). This crown gear (34) works in conjunction with a second crown gear (35) which is connected to the chassis (1) by means of spokes (36). The mobile crown gear (34) is positioned inside the crown gear (35) concentrically to the articulation axle (14) of the supporting arm (6). The second crown gear (35) is fixed and concentric to the articulation axle (20) of the crank (15) on the chassis (1). The mobile crown gear (34) has cogs (37) which engage with studs (38) on the fixed crown wheel (35). These studs (38) and cogs (37) form gearing.

The number of studs (38) on the fixed crown gear (35) is equal to four-thirds of the number of cogs (37) on the mobile crown gear (34). In the example shown in FIG. 2, the studs (38) are sixteen in number, whilst the mobile crown gear (34) has twelve cogs (37). Thus, when the crank (15) is put into rotation around the articulation axle (20) with the chassis (1), the mobile crown gear (34) travels on the fixed crown gear (35). It then causes the supporting arm (6) of the cutting device (7) to rotate around the articulation axle (14) in such a manner that the aforementioned cutting device moves in the path (T), as previously described.

Figure 4:
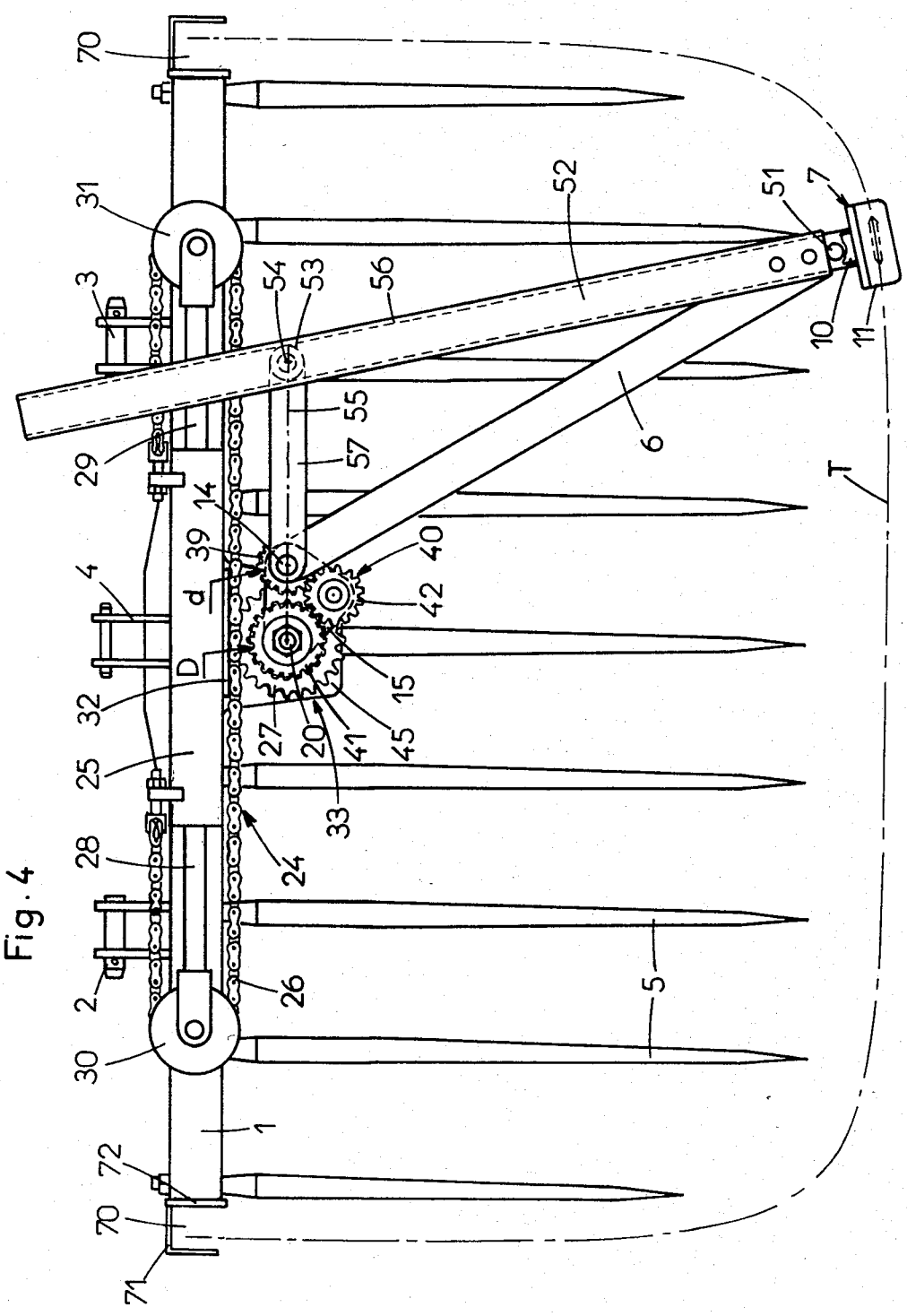
FIG. 4 is a plan view of a modification.
Figure 5:
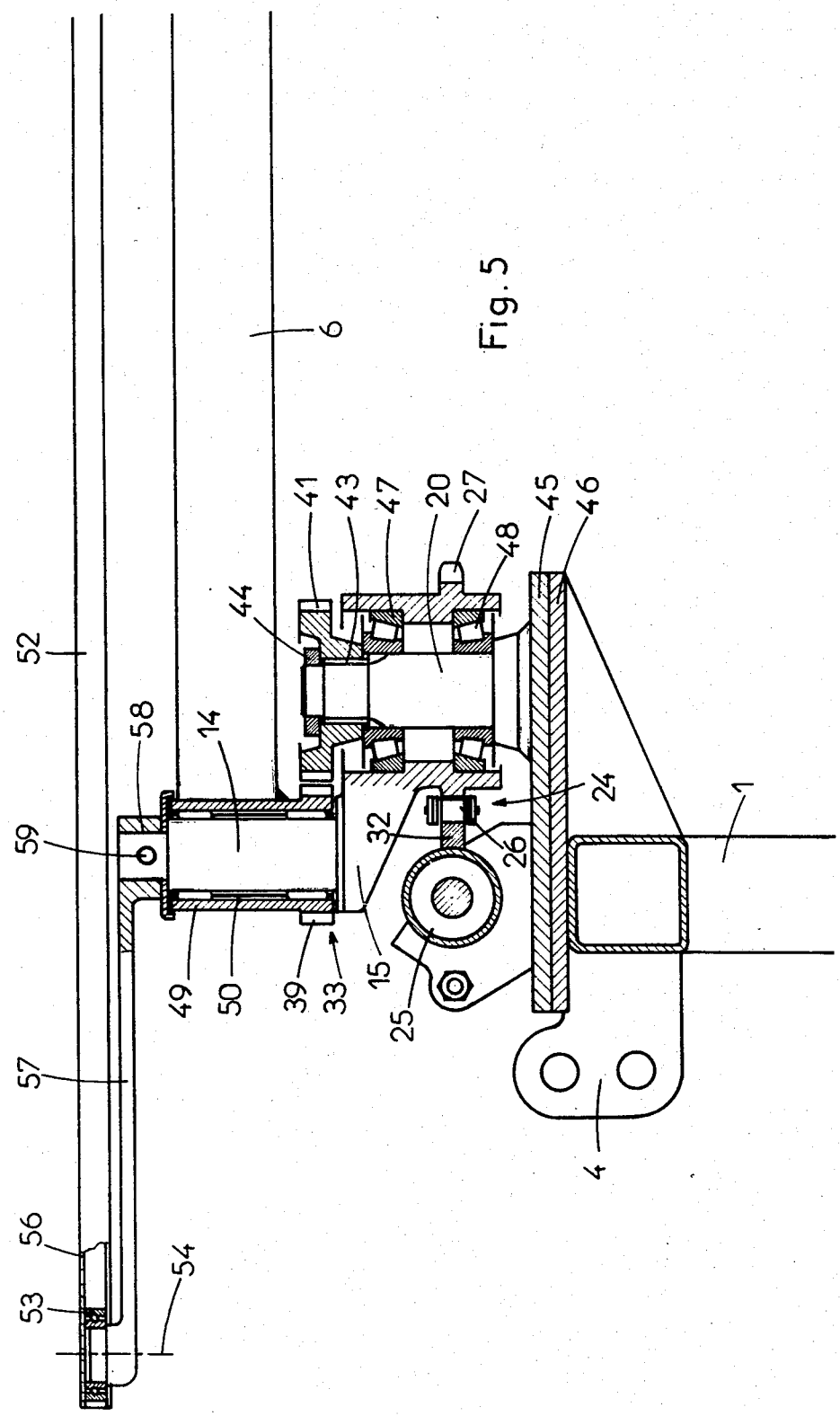
FIG. 5 is a large scale fragmentary view, partly in section of a driving mechanism of the modification of FIG. 4.

In the second example of execution shown in FIGS. 4 and 5, the means (33) are composed of a pinion (39) which forms one piece with the arm (6) bearing the cutting device (7). This pinion works in conjunction with a toothed wheel (41), with the aid of an intermediate element (40). The toothed wheel is fixed in relation to the chassis (1) of the machine. The intermediate element ensures that the pinion (39) rotates in a direction which is opposite to the direction of rotation of the crank (15). In the example shown, it consists of a pinion (42) situated on the crank (15). The element could also be a different unit, such as a chain passing along the pinion (39) and the toothed wheel (41). This toothed wheel (41) is positioned concentrically on the articulation axle (20) of the crank (15) on the chassis (1) by means of grooves (43) and a nut (44). As shown in FIG. 5, the articulation axle (20) forms one piece with a plate (45) screwed to a second plate (46) which, in turn forms one piece with the chassis (1). The crank (15) is guided on this axle (20) by means of two bearings with conical rollers (47,48). The pinion (39) is concentric to the articulation axle (14) with the crank (15). It is extended upwards and forms a sleeve (49) to which the supporting arm (6) is connected. The unit formed by the pinion (39), the sleeve (49) and the supporting arm (6) is guided on the articulation axle (14) by means of a needle cage bearing (50).

In this version, the primitive diameter (D) of the toothed wheel (41) is equal to four-thirds of the primitive diameter (d) of the pinion (39) which forms one piece with the supporting arm (6). This ratio also permits synchronisation of the rotation of the supporting arm (6) and the crank (15), so that the path (T) of the cutting device (7) conforms with the path previously described.

As in the previous example, the rotation of the crank (15) around its articulation axle (20) on the chassis (1) causes the supporting arm (6) to rotate around its articulation axle (14), as a result of the interaction between the toothed wheel (41) and the two pinions (39,42).

The driving means (33) described above are very compact. Therefore, when the arm (6) bearing the cutting device (7) is brought into a position substantially parallel to the chassis (1), the volume above the prongs (5) is almost totally cleared. The machine may then be used for transporting voluminous products such as bales of forage.

In accordance with another feature of the invention, the cutting device (7) is guided whilst in motion in such a manner that the knives (8,9) remain constantly at a tangent to their path (T). For this purpose, the device is hinged to the supporting arm (6) by means of a substantially vertical axle (51). As shown in the example in FIGS. 1 to 5, the cutting device (7) includes a triangle (52) which forms both one piece with its case (11) and is also guided on a roller (53), located almost at the instantaneous centre of rotation (54). The centre of rotation is located, at any given moment, at the intersection of the perpendicular line to the path (T) of the knives (8,9) and a straight line (55) passing through the two articulation axles (20 and 14) (see FIGS. 2 and 4). This triangle (52) extends perpendicularly to the knives (8,9) of the cutting device (7) and has a groove (56) into which the roller (53) fits. This roller (53) forms one piece with an arm (57) which moves with the crank (15). As shown in FIGS. 3 and 5, this arm (57) is attached at the upper part of the articulation axle (14) which, itself, forms one piece with the crank (15). To make this attachment, the axle (14) is extended over the lid (18) and fits into a bore (58) in the arm (57). The mechanical connection between this axle (14) and the arm (57) is made by a pin (59).

Figure 6:
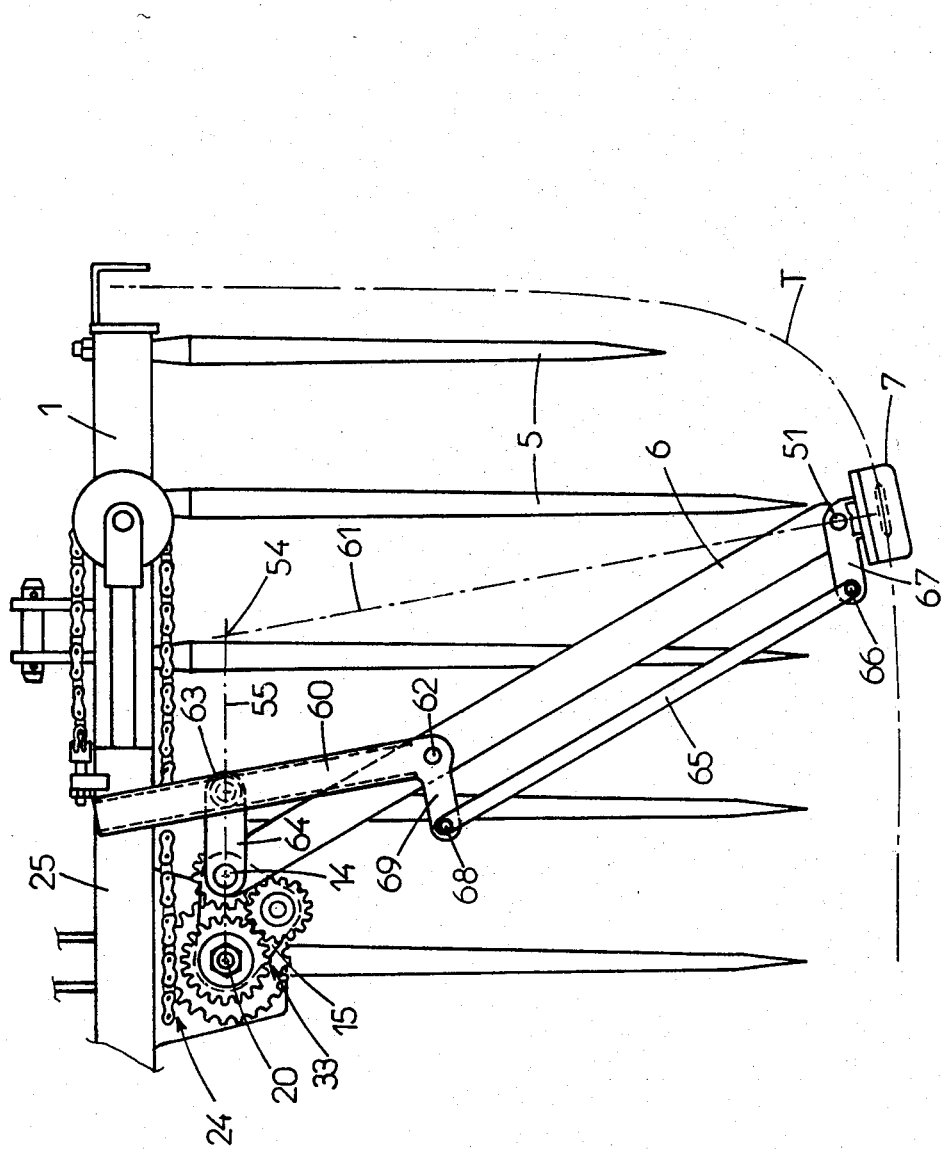
FIG. 6 is a plan view, showing modified means for orientating a cutting device.

In an alternative version shown in FIG. 6, only the devices used to guide the cutting device (7) change. The cutting device is guided here by means of a triangle (60), parallel to a straight line (61) normal to the path (T) of the knives (8,9) and passing through the instantaneous centre of rotation (54). This triangle is both hinged to the supporting arm (6) by means of an articulation axle (62) and also guided on a roller (63) which is located on a straight line (55) passing through the articulation axles (14 and 20) and the aforementioned instantaneous centre of rotation (54). The roller (63) is also attached to an arm (64), mounted as in the previous example on the articulation axle (14) of the supporting arm (6) with the crank (15). A connecting rod (65) links up the triangle (60) and the cutting device (7). The rod is hinged at one of its extremities to an axle (66) of a lug (67) which forms one piece with the cutting device (7) and, at its other extremity, to an axle (68) of a lug (69) which forms one piece with the triangle (60). The articulation axles (62,66,68 and 51) should, in preference, be arranged in the form of a parallelogram. This arrangement reduces bulkiness of the devices necessary to guide the cutting device (7).

In the two embodiments of the invention, the triangle (52, 60) causes the cutting device (7) to pivot around the articulation axle (51), so that the knives (8,9) remain constantly parallel to their forward direction—i.e. at a tangent to their path (T). This is caused by the fact that the roller (53,63) moves the triangle (52,60), according to the instantaneous centre of rotation (54), around the articulation axle (20). This feature yields a good cut and the knives (8,9) require a minimal amount of energy to move inside the forage means. It also reduces friction to the knives (8,9) in the curved areas of the path (T).

On each side of the chassis (1), there is housing (70) for the knives (8,9). Each housing element (70) is composed of a screen (71) in the shape of an angle, extending in a parallel line to the corresponding upright part (72) of the chassis (1) and, through that upright part. The knives (8,9) are thus protected against knocks and are not deformed by the mass of forage when the machine is pushed into the silo to extract a block. They start cutting from an upright position and this avoids deviations whilst in motion. The housing elements (70) also offer protection to persons in the vicinity when the machine is not in use.

The device according to the invention is hitched to a tractor to extract a block of forage from a silo. With the aid of the tractor, the prongs (5) on the loser part of the chassis (1) are plunged into the forage. The two knives (8,9) are then driven by means of a hydraulic motor (10) and moved with the aid of the supporting arm (6) following the path (T) in order to cut a block of forage with a substantially rectangular shape. The knives (8,9) have the benefit of two edges to enable to work as well both from right to left and from left to right.

The cut block of forage may then be removed from the silo and transported to the feeding point where it can be distributed immediately or stored for several days. The machine according to the invention may also be equipped with a shredding and distribution device.

Obviously any number of improvements, modifications or additions could be made, and, to the constructions previously described and certain elements could also be replaced by equivalent elements, without departing from the scope of the present invention.

We claim:

1. A machine for removing blocks of forage from inside a horizontal silo,
   comprising in combination,
   a chassis having a lower part;
   a plurality of prongs arranged on the lower part of the chassis and extending substantially horizontally;
   an arm located above the prongs at a predetermined distance and having an outer extremity;
   a cutting device arranged on the outer extremity of the arm;
   a crank;
   a substantially vertical first axle hingedly connecting the arm with the cutting device to the crank; and
   a second axle hingedly connecting the crank to the chassis and offset from said first axle;
   crank driving means for driving said crank about said second axle, said means including a double acting hydraulic jack, a chain driven by said jack and a crown gear integral with each crank.

2. A machine as defined in claim 1 further comprising arm rotating means for rotating said arm with said cutting device about said first axle, said crank driving means and said arm rotating means being arranged so that said crank and said arm rotate in opposite directions relative to one another.

3. A machine for removing blocks of forage from inside a horizontal silo,
comprising in combination,
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with the cutting device to the crank; and
a second axle hingedly connecting the crank to the chassis and offset from said first axle; said cutting device having knives and being guided during its motion about a further axle on the arm so that the knives remain constantly at a tangent to their path; and further comprising means for guiding the cutting device and including a triangle forming one piece with said cutting device, and a roller located substantially at an instantaneous center of rotation of the cutting device and guiding said triangle.

4. A machine as defined in claim 3, wherein said knives extend in a predetermined direction and said triangle extends perpendicularly to said knives.

5. A machine as defined in claim 4, wherein said triangle is provided with a groove, and a roller guiding said triangle is located in said groove.

6. A machine as defined in claim 3, and further comprising a further arm connected with said crank, said roller being formed of one piece with the further arm.

7. A machine for removing blocks of forage from inside a horizontal silo,
comprising:
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with the cutting device to the crank; and
a second axle hingedly connecting the crank to the chassis and offset from said first axle; and
wherein the cutting device has knives and is guided during its motion about a further axle on the arm; and further comprising means for guiding said cutting device and including a triangle disposed substantially parallel to a straight line perpendicular to a path of the knives and passing through the instantaneous center of rotation, said triangle being hinged to said arm, a connecting rod connecting said triangle to said cutting device, and a roller guiding the triangle and located on a straight line which passes through said first and second axles of the crank and the instantaneous center of rotation.

8. A machine as defined in claim 7, wherein said triangle and the cutting device have lugs, said rod being hingedly connected at one extremity with an additional axle formed of one piece with a lug of said triangle and at its other extremity to still an additional axle which is of one piece with a lug of said cutting device.

9. A machine defined in claim 8, wherein said triangle is hingedly connected with said arm by still a further axle, the additional axles of said connecting rod, the further axle of the cutting device on the arm, and the still further axle of said triangle on the arm being arranged in the form of a parallelogram.

10. A machine as defined in claim 7; and further comprising an additional arm connected to said crank, said roller being attached to said additional arm.

11. A machine for removing blocks of forage from inside a horizontal silo,
comprising, in combination,
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with the cutting device to the crank,
a second axle hingedly connecting the crank to the chassis and offset from said first axle,
means for driving the crank about the axle of connection of the crank with the chassis, and
means for rotating the arm with the cutting device about said first axle, said crank driving means and said arm rotating means being arranged so that the crank and the arm rotate in opposite directions relative to one another, the rotation speed of said arm being equal to four-thirds of the rotation speed of said crank, wherein the crank driving means includes a double-acting hydraulic jack, a chain driven by the jack, and a crown gear formed of one piece with the crank.

12. A machine for removing blocks of forage from inside a horizontal silo,
comprising, in combination,
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with the cutting device to the crank,
a second axle hingedly connecting the crank to the chassis and offset from said first axle,
means for driving the crank about the axle of connection of the crank with the chassis, and
means for rotating the arm with the cutting device about said first axle, said crank driving means and said arm rotating means being arranged so that the crank and the arm rotate in opposite directions relative to one another, the rotation speed of said arm being equal to four-thirds of the rotation speed of said crank, wherein the arm driving means includes a mobile crown gear formed of one piece with the arm, and a second crown gear which is arranged stationary on the chassis and with which the mobile crown gear cooperates and wherein the mobile crown gear is located inside the second crown gear concentrically to the first mentioned axis of connection of the arm with the crank and the second crown gear is arranged concentrically to the second axle of connection of the crank with the chassis.

13. A machine as defined in claim 12, wherein the stationary second crown gear has a plurality of studs, the mobile crown gear having a plurality of cogs engaging with the studs of the stationary crown gear.

14. A machine as defined in claim 13, wherein the mobile crown gear has a predetermined number of the cogs, the stationary crown gear having a number of the studs which is equal to four-thirds of the number of cogs of the mobile crown gear.

15. A machine for removing blocks of forage from inside a horizontal silo,
comprising, in combination,
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with the cutting device to the crank,
a second axle hingedly connecting the crank to the chassis and offset from said first axle,
means for driving the crank about the axle of connection of the crank with the chassis, and
means for rotating the arm with the cutting device about said first axle, said crank driving means and said arm rotating means being arranged so that the crank and the arm rotate in opposite directions relative to one another, the rotation speed of said arm being equal to four-thirds of the rotation speed of said crank, wherein the arm rotating means includes a pinion formed of one piece with the arm, a toothed wheel which is fixed relative to the chassis, and an intermediate element through which the pinion cooperates with the toothed wheel, and wherein the pinion has a predetermined primitive diameter, the fixed toothed wheel having a primitive diameter which is equal to four-thirds of the primitive diameter of the pinion.

16. A machine as defined in claim 15, wherein the intermediate element is formed as a pinion arranged on the crank.

17. A machine as defined in claim 15, wherein the intermediate element is formed as a chain passing over the pinion and the toothed wheel.

18. A machine as defined in claim 15, wherein the toothed wheel is arranged concentrically relative to the second axle of connection of the crank to the chassis.

19. A machine as defined in claim 15, wherein the pinion is arranged concentrically relative to the first mentioned axle of connection of the arm with the crank.

20. A machine for removing blocks of forage from inside a horizontal silo,
comprising in combination,
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with the cutting device to the crank,
a second axle hingedly connecting the crank to the chassis and offset from said first axle,
means for driving the crank about the axle of connection of the crank with the chassis, and
means for rotating the arm with the cutting device about said first axle, said crank driving means and said arm rotating means being arranged so that the crank and the arm rotate in opposite directions relative to one another, the rotation speed of said arm being equal to four-thirds of the rotation speed of said crank,
and wherein the cutting device has knives and is guided during its motion about a further axle on the arm so that the knives remain constantly at a tangent to their path; and further comprising means for guiding the cutting device, said means including a triangle formed of one piece with the cutting device, and a roller located substantially at an instantaneous center of rotation of the cutting device and guiding the triangle.

21. A machine as defined in claim 20, wherein the knives of the cutting device extend in a predetermined direction, the triangle of the guiding means extends perpendicularly to the knives.

22. A machine as defined in claim 21, wherein the triangle is provided with a groove, a roller which guides the triangle being located in the groove of the latter.

23. A machine as defined in claim 20; and further comprising a further arm connected with the crank, the roller being formed of one piece with said further arm.

24. A machine for removing blocks of forage from inside a horizontal silo,
comprising in combination,
a chassis having a lower part;
a plurality of prongs arranged on the lower part of the chassis and extending substantially horizontally;
an arm located above the prongs at a predetermined distance and having an outer extremity;
a cutting device arranged on the outer extremity of the arm;
a crank;
a substantially vertical first axle hingedly connecting the arm with a cutting device to the crank,
a second axle hingedly connecting the crank to the chassis and offset from said first axle,
means for driving the crank about the axle of connection of the crank with the chassis, and
means for rotating the arm with the cutting device about said first axle, said crank driving means and said arm rotating means being arranged so that the crank and the arm rotate in opposite directions relative to one another, the rotation speed of said arm being equal to four-thirds of the rotation speed of said crank,
and wherein the cutting device has knives and is guided during its motion about a further axle on the arm; and further comprising means for guiding said cutting device and including a triangle disposed substantially parallel to a straight line perpendicular to a path of the knives and passing through the instantaneous center of rotation, and being articulated on the arm, a connecting rod hingedly connecting said triangle to the cutting device, and a roller guiding the triangle and located on a straight line which passes through said first and second axles of the crank and the instantaneous center of rotation.

25. A machine as defined in claim 24, wherein the triangle and the cutting device have lugs, the connecting rod being hingedly connected at its one extremity with an additional axle to the lug of the triangle and at its other extremity to still an additional axle to the lug of the cutting device.

26. A machine as defined in claim 25, wherein the triangle is hingedly connected with the arm by still a further axle, the additional axles of the connecting rod, the further axle of the cutting device on the arm, and the still further axle of the triangle on the arm being arranged in the form of a parallelogram.

27. A machine as defined in claim 24; and further comprising an additional arm connected to the crank, the roller being attached to the additional arm.

* * * * *